United States Patent [19]

Austad et al.

[11] 3,848,354

[45] Nov. 19, 1974

[54] QUICK TIE DEVICE

[76] Inventors: Grover R. Austad, Ronald G. Austad, both of 801 17th Ave. North, Great Falls, Mont. 59401

[22] Filed: Dec. 18, 1972

[21] Appl. No.: 315,934

[52] U.S. Cl............... 43/42.49, 43/42.25, 43/42.53, 43/44.83, 24/131 C
[51] Int. Cl. ..................... A01k 85/08, A01k 91/04
[58] Field of Search............ 43/42.36, 42.49, 42.53, 43/44.83, 44.92, 42.25; 24/131 R, 131 C

[56] References Cited
UNITED STATES PATENTS

| | | | |
|---|---|---|---|
| 2,315,575 | 4/1943 | Austad | 43/42.36 |
| 2,984,882 | 5/1961 | Winn | 43/44.83 |
| 3,604,143 | 9/1971 | Sauers | 43/44.83 |

FOREIGN PATENTS OR APPLICATIONS

| | | | |
|---|---|---|---|
| 641,085 | 5/1962 | Canada | 43/44.83 |

*Primary Examiner*—Warner H. Camp
*Attorney, Agent, or Firm*—Criddle & Thorpe

[57] ABSTRACT

A quick tie device for use by fishermen including an eye-type snubbing post formed, preferably, by bending portions of a wire body to project at an angle essentially normal to the body, and a method of use of such device. By wrapping a section of leader line that is held alongside the eye body, first around the body area between the post and a spaced open eyelet, then making several wraps behind the post, then again wrapping a turn around the body between the post and open eyelet, and pulling the leader between the open eyelet loop and the shank end thereof; the leader is threaded through the open eyelet and a secure connection of the leader to the quick tie eye is made. The connection can be readily released by reversing the tying steps. The quick tie eye can be formed as the eyelet end of hooks, flies, flatfish, sinkers, swivels and other such items used in fishing, whereby one or a number of fishing devices can be readily attached to and detached from section of leader or line without the necessity for breaking or damaging the leader or line.

1 Claim, 13 Drawing Figures

PATENTED NOV 19 1974　　3,848,354

QUICK TIE DEVICE

BRIEF DESCRIPTION OF THE INVENTION

1. Field of the Invention

This invention relates to fishing devices and for components for connecting such a device to a section of leader or fish line.

2. Prior Art

Be there a man with soul so dead that he hasn't dreamed of pulling a granddaddy trout, bass or other fighting fish from his favorite lake or stream? To this end, the ardent fisherman spends hours exposed to the elements, insects, etc., in hopes of landing the big one. Such attention, of course, has spawned a multitude of fishing accessories that enable the fisherman to catch fish. While this interest has produced numerous lures and other devices intended to attract fish, little emphasis, to my knowledge, has been placed on improving the means for securely attaching a lure, hook, fly, swivel, or like device to a leader. Today, just as a century ago, the fisherman generally attaches a fly, hook, or the like to his line with a knot, which he must later untie or cut when the device is to be removed. Should the fisherman be using a tapered leader, as in fly fishing, periodic installations and removal of flies thereon will generally result in a loss of the thin or tapered part of such a leader, requiring periodic replacement of the entire leader at a significant expense.

While tying a fishing device to a line with a knot has been in the past, and is probably still today, the most commonly practiced way of attaching a lure to a line, a detachable fishing fly or lure, U.S. Pat. No. 2,315,575 was developed by one of the co-inventors herein as a partial solution to the question of how best to attach and detach a lure or fly to a fishing line. The patent shows a hook having an eyelet end tied to a leader and arranged with a special lure or fly having a closed eyelet in its center body portion, and an open eyelet formed at one end. The hook is attached to the lure or fly by feeding the hook, barbed end first, through the closed eyelet, pushing and rotating the hook therethrough until the leader is positioned alongside the open eyelet, whereat the leader is pulled between the open eyelet loop and the loop shank, to thread the leader therethrough. This arrangement allows a number of lures or flies to be sequentially attached to a single hook that, more or less, is permanently tied to the end of a leader.

SUMMARY OF THE INVENTION

It is a principal object of the present invention to provide a quick tie eye consisting of a body on which are arranged an upstanding post and an open eyelet arrangement around and through which post and open eyelet, respectively, a leader is wrapped to secure the leader thereto.

Another object is to provide a quick tie eye composed of a post and open eyelet arrangement that is easily and inexpensively formed as the eye and portion of a fly skeleton, hook, swivel, spinner, or other such fishing aids during the manufacturing process.

Still another object is to provide a quick tie eye which, when a section of leader is attached thereto, will not interfere with the performance of the lure, or like fishing device, on which the quick tie eye is formed. Still another object is to provide a quick tie eye for attachment to a section of leader by a method of making a number of wraps of the leader sequentially therearound.

Principal features of the present invention include a body or skeleton which is, or on which, a fishing device is formed. The quick tie eye is formed on said body or skeleton as the eye end thereof, and consists of a post and an open eyelet that is formed as an end of the skeleton or body. The post and open eyelet are arranged proximate to one another with a small length of the body exposed therebetween, with the post preferably extending upwardly when the body or skeleton is positioned for attachment onto a leader.

For ease of manufacture a closed eyelet, having its most narrow width dimension proximate to its point of contact with the body, is preferably formed as the post of the invention. Obviously, the post could also be manufactured separately and then be attached to the body or the post, and body could be formed by other than bending a wire body into a closed loop.

The open eyelet is formed to be in a plane that is horizontal to the plane of the upright post and comprises a circular bend in a forward end of the eyelet body or skeleton, and with the shank end thereof bent back over the circular bend to preferably stand outwardly from the body or skeleton on the post side thereof but extending in a direction away from the upright post. The construction is such that the open eyelet shank end and the eyelet body will just permit passage of the leader therebetween. The eyelet shank end, standing outwardly from the plane of the open eyelet, is almost in the plane of the post, but is tilted slightly forward therefrom and terminates over the open eyelet. The forward tilt of the eyelet shank end keeps the leader, as in casting operations, from inadvertently hooking thereover to perhaps foul the leader in the open eyelet or to allow release of the line therefrom.

The quick tie eyelet, formed as a component of a fly, lure or other fishing device, is connected to a leader or other such line by positioning the eye post end up, with the leader held alongside, such that the leader extends along the body towards the open eyelet end. So arranged, the leader is first wrapped around the eyelet body in the area between the post and the open eyelet. The leader is then brought around the post and several turns are taken around the eye body on the opposite side of the post from the open eyelet. The leader is then brought between the post and the open eyelet, wrapping at least one and one half turns towards the operator, around the eye body between the post and open eyelet. Thereafter, the leader is guided over the open eyelet shank end and is pulled against and through the gap formed between the open eyelet shank end and the side of the open eyelet, threading the leader through the open eyelet. The fishing device can be removed from the connected leader by simply reversing the installation steps.

The connection formed by this method of tying a leader to a fishing device is stronger than is the ordinary knot, since it doesn't cut into itself. However, should a still more positive connection be desired, the connection outlined above can be "locked in" by pushing the leader back through the open eyelet until a loop is formed therein, which loop can be swung over the upstanding eyelet shank end before the leader is again pulled taut locking the leader thereover. Of course, to unlock the connection formed, the loop must be loosened and swung back over the eyelet shank end prior to unwrapping of the leader.

Additional objects and features of the present invention will become apparent from the following detailed description, taken together with the accompanying drawings.

THE DRAWINGS

Figure 1:
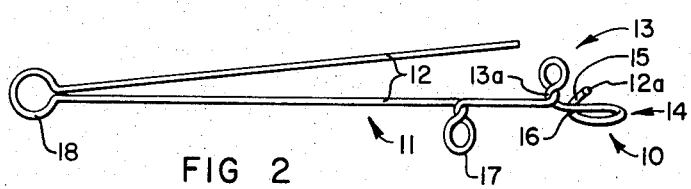
FIG. 1 is a side elevation view of an eyelet body or skeleton on which a fly is to be formed, with the quick tie eye of the present invention formed on a forward end portion thereof.
Figure 2:
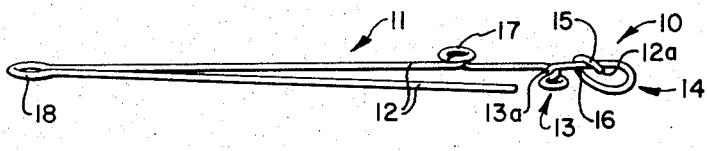
FIG. 2, is a top plan view of the skeleton of FIG. 1.
Figure 3:
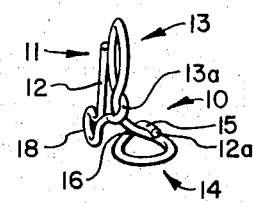
Figure 4:
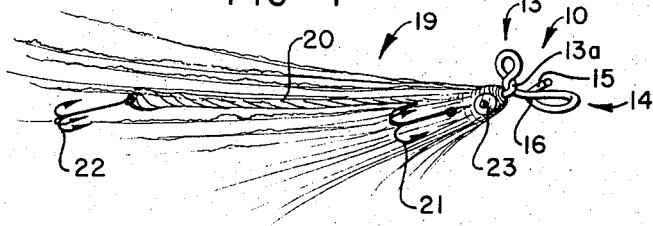
Figure 5:
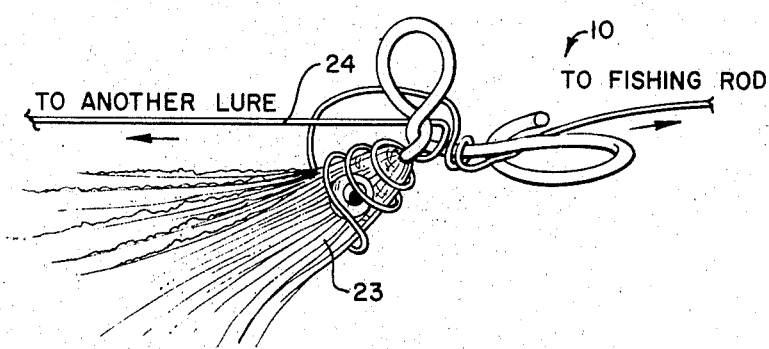
Figure 6:
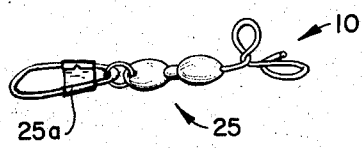
Figure 7:
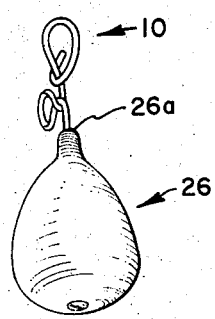
Figure 8:
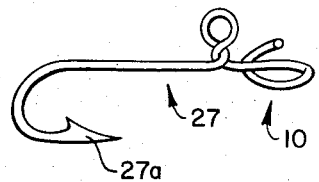
Figure 9A:
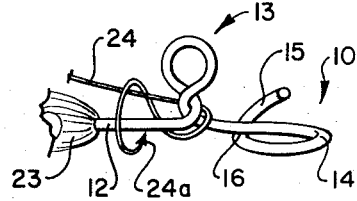
Figure 9B:
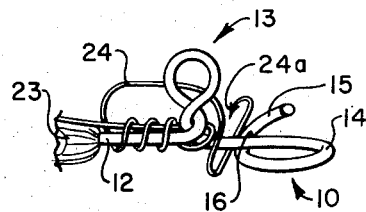
Figure 9C:
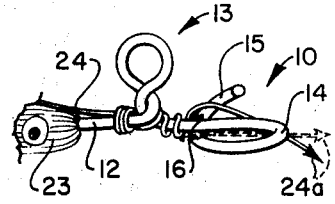
Figure 9D:
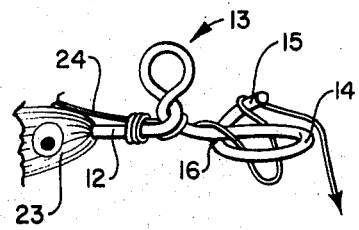
Figure 9E:
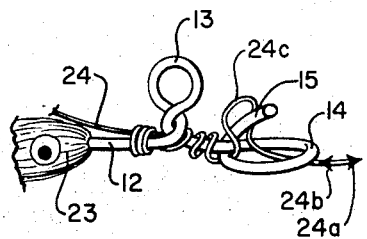

FIG. 3, an enlarged front elevation view of the skeleton of FIGS. 1 and 2;

FIG. 4, a side elevation view showing a fly formed on the skeleton shown in FIGS. 1–3;

FIG. 5, an enlarged fragmented view of the head and quick tie eye of the fly of FIG. 4, showing a leader wrapped therearound;

FIG. 6, a side elevation view of a barrel swivel and safety pin fishing device incorporating the quick tie eye of the present invention on a forward end portion thereof;

FIG. 7, a side elevation view of a swivel sinker fishing device incorporating the quick tie eye of the present invention on a top end thereof;

FIG. 8, a side elevation view of a fish hook incorporating the quick tie eye of the present invention on an end portion thereof;

FIGS. 9a–9e are side elevation views of the quick tie eye of the present invention showing, in FIGS. 9a and 9b, the leader being wrapped around the eye, in FIG. 9c the leader being threaded through the open eyelet thereof, in FIG. 9d the leader being unthreaded from the open eyelet thereof, and in FIG. 9e the leader being "locked in" around the quick tie eyelet shank end.

DETAILED DESCRIPTION

Referring now to the drawings:

A first embodiment of the present invention in a quick tie eye 10 hereinafter referred to as "the eye," is shown in FIGS. 1–8 wherein the eye 10 is formed as the leader connecting, end portion of a number of different flies, hooks, and other fishing accessories.

FIGS. 1–3, show side, top and front views of a skeleton 11 formed from a straight piece of wire 12 wherein the eye 10, FIGS. 1–3, is formed by bending the wire 12, proximate to an end 12a thereof into first a post 13 comprising a loop that is twisted upon itself at 13a. An open eyelet 14, positioned in a plane normal to the plane of the post 13 is formed in wire end 12a, by bending the wire end back upon itself into a loop. An open eyelet shank end 15 formed thereby is then bent across the wire 12 to stand outwardly from the other side of the eyelet preferably adjacent post 13 but extending in a direction away from of the post 13. A gap 16 is formed thereby between the shank end 15 and the eyelet 14 which will accommodate a section of fishing leader, not shown, in FIGS. 1–3 guided therethrough. As shown in FIG. 1, the shank end 15 is preferably bent slightly outwardly from the plane of the post 13 to prevent unintentional hooking of a leader, not shown, in FIG. 1, thereover, as will be explained in detail later herein. In addition to the bends made to form eye 10, the skeleton 11 is twisted upon itself at a point back of eye 10 to form a closed loop 17 and is bent back upon itself to form an open loop 18. A fly body 20 is constructed on the skeleton 11 by winding thread, feathers, and the like therearound in conventional fly tying fashion to form a composite fly 19 shown in FIG. 4. Fly 19 has treble hooks 21 and 22 connected at the respective closed and open loops 17 and 18.

FIG. 5 shows an enlarged view of a head portion 23 of the fly 19 and with the eye 10 of the present invention protruding from the end or mouth area thereof. A leader 24 is shown in FIG. 5, wrapped at other than an end portion thereof, around the eye 10 and head portion 23 by a method that will be hereinafter described in detail, to securely connect the fly to the leader. As seen from the arrows and notations therein, the fly 19 is being attached to the leader 24 at other than an end portion thereof, as one of a chain of lures, flies or other fishing devices. The utilization of the fly 19 as one of a chain of flies or lures all attached directly to the leader 24 points up a unique and highly desirable utilization made possible by use of the eye 10 of the present invention. Such a train of fishing devices could be arranged with a plug or wiggler, following a fly, following a spinner, or like combination designed to attract, and to stimulate the appetite of, a fish. Such a train can be composed of a number of flies, lures or the like providing a multitude of combinations of fish attractive arrangements lending variety to the sport. Such trains using fishing devices incorporating the eye 10 of the present invention can be changed easily and quickly without damaging the leader, to allow the inclusion of different fishing devices therein, until the optimum combination is obtained.

Typical fishing devices incorporating the eye 10 of the present invention are shown in FIGS. 6–8. While typical, these make up but a few of the numerous fishing devices that the eye 10 can be used with. FIG. 6 shows a barrel swivel and safety pin 25 with the eye 10 of the present invention formed on the swivel end that is opposite to the safety pin portion 25a thereof. FIG. 7 shows a swivel sinker 26 having an eye 10 of the present invention formed at the top end of the swivel portion 26a thereof. FIG. 8 shows a standard fish hook 27 having a hook and barb 27a formed on one end thereof with the eye 10 of the present invention formed on its other end. It should of course be obvious that many other fishing devices, not shown, such as spinners, pop gear, plugs, and the like, to name but a few, could incorporate the eye 10 of the present invention into their construction as the leader connecting end thereof.

FIGS. 9a–9e shows a leader 24 as it is being wrapped around the head 23 of the fly 19 and the eye 10 of the present invention which projects outwardly therefrom. Leader 24 is shown in FIGS. 9a–9c being wrapped, as will be explained later herein, around the eye 10 post 13 and open eyelet 14, behind post 13 and threaded through the open eyelet 14 to secure the leader to the fly head 23. FIG. 9d shows the leader 24 being unthreaded from the open eyelet 14, and FIG. 9e shows the leader 24, wrapped as shown in FIGS. 9a–9c, being "unlocked in."

In practice, as shown in FIG. 9a, leader 24 is held alongside the fly 19 and extending from a point along the fly body, not shown, towards the eye 10 with the post 13 of the eye 10 pointing upwardly. The leader 24 is wrapped as shown by the arrow on the end 24a thereof, once or twice around the eye 10 in the area between the post 13 and open eyelet 14. Arrow 24a on the leader 24 should, of course, not be taken as being the actual leader 24 end and is shown herein only to clearly point up the manner and direction of wrap of leader 24 around the wire 12 which makes up the body of the eye 10. The leader 24 is then brought around post 13 as shown in FIG. 9a and several turns are taken around the wire 12 on the opposite side of post 13 from the open eyelet 14. The leader 24 is thereby wrapped around that portion of itself that is held alongside the wire 12 back from the head 23. In making the wraps thus far described, leader 24 may be wrapped towards or away from the user, as desired, around the eye 10 and wire 12. When, however, the leader 24 is again brought around post 13 the additional turns taken around the eye 10 between post 13 and open eyelet 14, FIG. 9b, must be made upwardly towards the user. At least one and one half such turns are made around eye 10 and then the leader 24 is positioned as shown in FIG. 9c, in the gap 16 between the open eyelet shank end 15 and the side of the open eyelet 14. Leader 24 is then pulled downwardly through the gap 16 between eyelet shank end 15 and the side of open eyelet 14, thereby threading the leader 24 through the open eyelet 14 to the dotted line position, FIG. 9c. So threaded, continued tensile forces applied to the leader in the direction shown by arrow 24a will tend to tighten the wraps taken around the wire 12 lashing the leader 24 tightly thereagainst. A secure lock of the leader 24 to the eye 10 is thus formed, which lock is made even more strong by the steady application of tensile or pulling forces to the leader in the direction shown by arrow 24a.

FIG. 9d shows the eye 10 maintained in the same attitude shown in FIGS. 9a–9c, with the leader 24 being unthreaded from the open eyelet 14. This is accomplished by looping the leader 24 back around the eyelet shank end 15 such that the leader is wrapped around the shank end 15, and unwrapping in the direction opposite to the wrap taken in accordance with FIG. 9c. Thereafter, the end of the leader 24 is pulled against and through gap 16 between the shank end 15 and the side of the open eyelet 14 unthreading leader 24 from the open eyelet 14, after which the leader is unwrapped from around the wire 12.

While the wrapping procedure as described above with respect to FIGS. 9a–9c secures the leader 24 to the eye 10, additional locking can be provided by forcing the leader 24 as shown by arrow 24b in FIG. 9e, through open eyelet 14 and back through the open eyelet to form a loop 24c in leader 24. The loop 24c is then moved over and onto the open eyelet shank end 15, FIG. 9d, and a tensile force is applied to the leader at 24, tightening the loop 24c around shank end 15. To release this additional lock, the leader 24 is again pushed against itself, in the direction shown by arrow 24b in FIG. 9e, enlarging loop 24c which can then be moved up and off of shank end 15 after which the leader 24 is unthreaded from the open eyelet 14 in the manner heretofore explained. Conceivably, the loop 24c, formed in the leader 24, could be moved over the post 13, not shown, to "lock in" the leader as explained with respect to the shank end 15.

The construction of eye 10 and its use as has been herein described enables a fisherman to connect a free end of his leader to a lure, having the eye formed therein, to connect such a lure to any point in his leader, or to connect a number of such lures into a chain at a number of points in his leader. Such described connections are easily formed or released, in a matter of seconds, without necessitating cutting or damaging the leader.

As has been previously mentioned the shank end 15 of the open eyelet 14 is arranged to project from the plane of the open eyelet 14, preferably extending in a direction away from the post 13, nd tilted somewhat forward from the plane thereof to terminate over the open eyelet. This arrangement insures that should leader 24 pass alongside the eye 10 contacting the shank end 15 the leader will slide thereover, away from the gap 16 between the shank end 15 and open eyelet 14 and that as the shank end 15 is arranged to extend upwardly, moss, sticks, or like items are restricted from becoming fouled thereagainst. The tilted configuration of shank end 15 therefore keeps the leader 24 from catching in the gap or possibly releasing itself therefrom when such is not desired, and its arrangement extending upwardly alongside the post 13, restricts moss, sticks, or the like from fouling thereagainst. Of course, the shank end 15 could be arranged to point downwardly, opposite to the post 13, without departing from the subject matter coming within the scope of the invention, but it is believed that such an arrangement would not be as satisfactory as is the arrangement disclosed herein.

Although the post 13 and open eyelet 14 have been shown herein as being considerably spaced apart, they could conceivably be formed very close together without departing from the arrangement of eye 10 taught herein. Furthermore, the plane of the open eyelet 14 could be tilted towards the plane of the shank end 15 such that a smaller angular distance is formed therebetween. This arrangement would provide an eye 10 that is less subject to having moss, debris, or other such undesirable materials cath thereon than is an eye where the shank end 15 extends substantially normal to the plane of the open eyelet 14.

The arrangements of eye 10 disclosed herein have involved post 13 and open eyelet 14 combinations that are formed as bends in a piece of wire 12. While such an eye 10 formed as bends in a wire 12 is preferred for ease of manufacture, it should be understood that either the post or open eyelet or both could be formed as separate structures which could then be attached to the eye end of a lure as by brazing them thereon. Also, while post 13 has been described as being in the form of a loop, the post could as well be solid particularly when used with a frame or skeleton made of plastic, nylon or the like.

Although a preferred form of our invention has been herein disclosed, it is to be understood that variations are possible without departing from the subject matter coming within the scope of the following claims, which subject matter we regard as our invention.

We claim:
1. A quick tie eye comprising
   an elongate body forming a fishing device to which a line is to be connected;
   a post connected to the body intermediate its length and projecting substantially normal to the elongate axis of the body; and
   an open eyelet formed at one end of said body and spaced from said post, said open eyelet being formed as an angled loop having an opening and having a shank end at least partially wrapped around the body and projecting therefrom to stand outwardly of the body with the free end of the shank being tipped in a direction away from the post and terminating over the open eyelet.

* * * * *